(12) United States Patent
Ho

(10) Patent No.: US 6,267,135 B1
(45) Date of Patent: Jul. 31, 2001

(54) ABS MODULATOR WITH DAMPING FOAM ON EXHAUST DIAPHRAGM

(75) Inventor: Thanh Ho, Brunswick, OH (US)

(73) Assignee: Honeywell Commerical Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/563,275

(22) Filed: May 3, 2000

(51) Int. Cl.[7] .................................................. F16K 47/02
(52) U.S. Cl. .......................... 137/102; 137/514; 251/64
(58) Field of Search ................... 137/102, 514; 251/64

(56) References Cited

U.S. PATENT DOCUMENTS

| | | | |
|---|---|---|---|
| 2,827,077 | * | 3/1958 | Mitchell . |
| 3,895,648 | * | 7/1975 | Stoll et al. ................ 137/102 X |
| 4,461,313 | * | 7/1984 | Beaumont .................... 137/102 |
| 5,279,322 | * | 1/1994 | Nakamura et al. ........... 137/102 |
| 5,425,572 | * | 6/1995 | Koelzer et al. ................ 303/69 |
| 6,026,836 | * | 2/2000 | Moenkhaus ............... 251/64 X |

* cited by examiner

Primary Examiner—Stephen M. Hepperle

(57) ABSTRACT

A noise reducer for a valve having a quick release function is disclosed. The noise reducer is preferably an open-celled structure that is impervious to dirt, moisture, alcohol, and oil, and acts as both a dampener and a biasing spring to reduce the oscillations of an exhaust diaphragm in an ABS modulator and urge the diaphragm toward a closed position. The open-celled foam is preferably an annular configuration so that it does not interfere with the amplitude of displacement of the diaphragm.

7 Claims, 2 Drawing Sheets

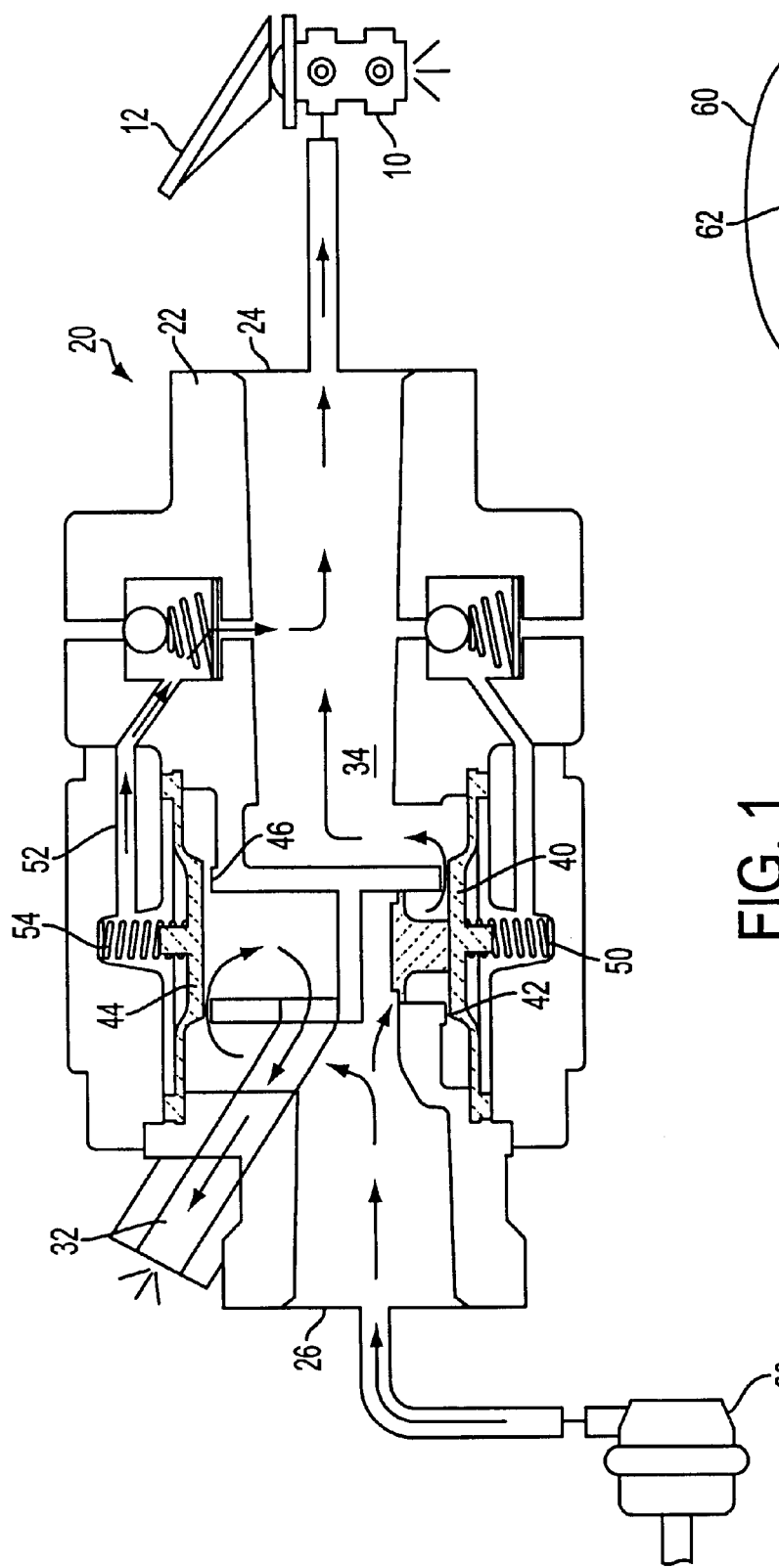
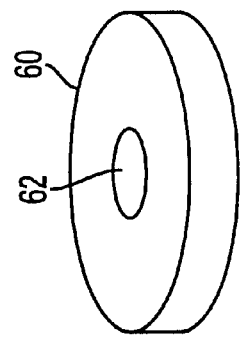
FIG. 1
FIG. 2

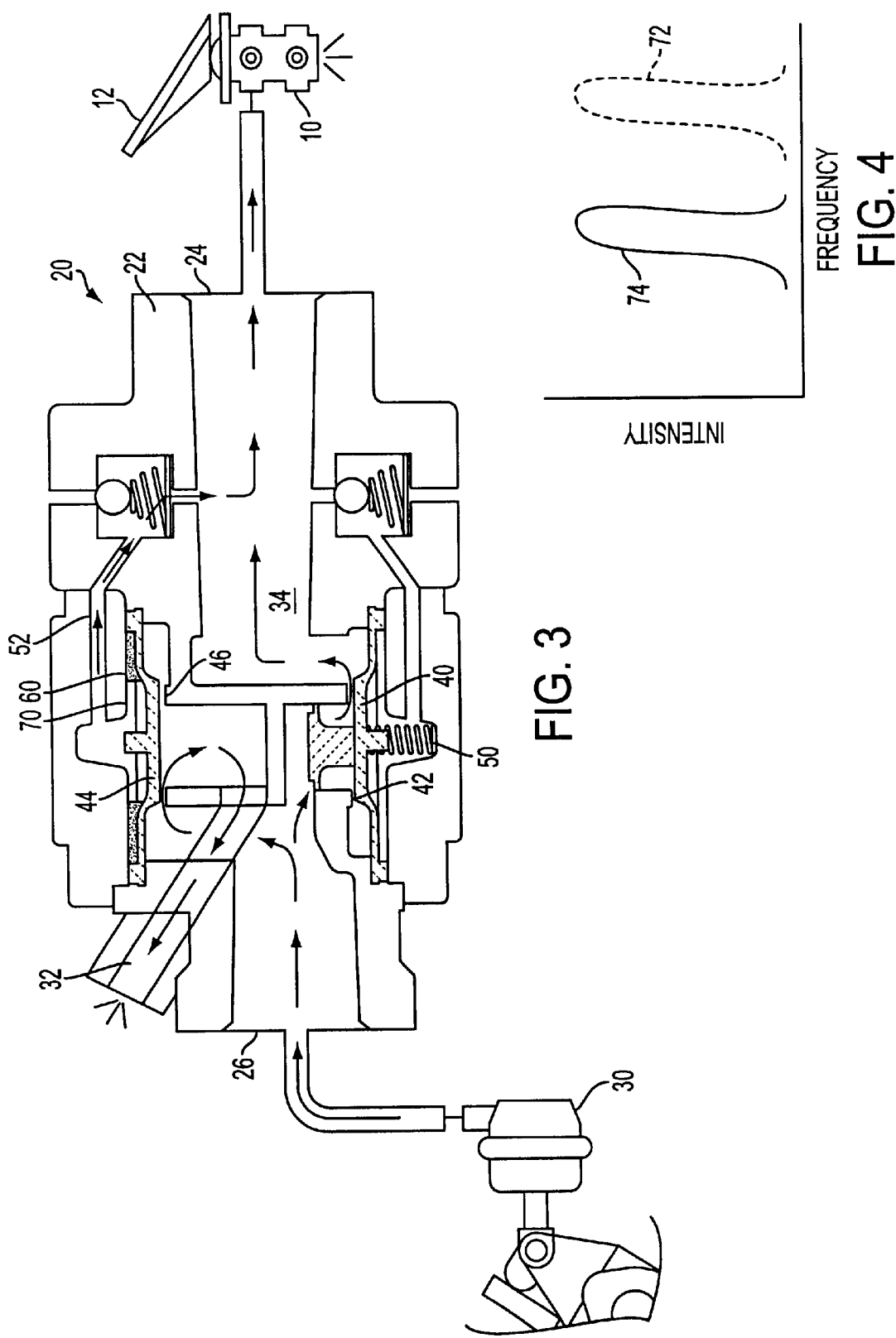

ABS MODULATOR WITH DAMPING FOAM ON EXHAUST DIAPHRAGM

BACKGROUND OF THE INVENTION

1. Field of the Invention

The present invention relates to a valve employing a quick exhaust feature that has an audible sound or "honking" generated during a quick exhaust function. More particularly, the invention relates to an anti-lock braking system ("ABS") modulator valve that regulates air flow to and from a wheel brake in a heavy vehicle and encounters an audible sound during release of the service brakes.

2. Discussion of the Art

A quick exhaust feature, using a diaphragm that is normally biased to a closed position with its valve seat via a biasing spring, has proved useful in quickly and effectively exhausting a large amount of air from a brake chamber during release of the service brakes. Specifically, a major portion of return service air from the brake chambers is expelled through an exhaust port of the modulator valve during brake release. The return service air has a slightly higher pressure and thus exerts a slightly greater force on the exhaust diaphragm than the combined forces resulting from a pilot pressure and spring loading on an opposed or rear face of the exhaust diaphragm. The diaphragm is lifted from its seat, the service air is expelled through the exhaust port, and then the diaphragm is re-seated. That is, as the service air is expelled through the exhaust port, the pressure drops slightly below the combined forces exerted by the pilot pressure and the spring load on the opposite face of the exhaust diaphragm. The exhaust diaphragm thus reseats and blocks the service air from expelling through the exhaust port. However, an unbalanced pressure situation occurs again across the exhaust diaphragm causing it to lift from the valve seat and expel the service air through the exhaust port. This oscillating motion of the exhaust diaphragm occurs within a very short time frame and results in an audible honking sound during brake release.

Although there is no problem associated with the sound, it is disturbing because of the high-pitched noise. A vehicle operator could become concerned that the brakes are not functioning properly when, in fact, the valve is operating properly and the service brakes are being released in an effective manner not possible with prior art arrangements.

Accordingly, a need exists to maintain the quick exhaust of air from the brake chambers/modulator valve so that all of the attendant features and benefits of that valve are maintained in conjunction with a decreased or muffled noise associated with the release of the service brakes.

SUMMARY OF THE INVENTION

The present invention contemplates a new and improved modulator that reduces or eliminates the audible noise associated with known devices.

According to the invention, a pneumatic valve controls air from a pressurized source to a brake chamber. A valve body includes a supply port, a delivery port, and an exhaust port. A diaphragm is disposed between the delivery port and the exhaust port to normally preclude communication therebetween. A noise reducer limits the noise level of the pressurized air exiting the valve chamber past the diaphragm.

According to another aspect of the invention, the noise reducer operatively engages the diaphragm to reduce the frequency of diaphragm oscillations as pressurized air exits therepast.

According to another aspect of the invention, the noise reducer is an open-celled foam structure that is substantially impervious to moisture, oil, dirt, and alcohol.

According to still another aspect of the invention, the noise reducer has an annular conformation so that it does not adversely impact on the amplitude of movement of the diaphragm.

A preferred method of limiting noise in the valve housing includes the step of reducing a frequency of diaphragm oscillations during brake release.

A primary benefit of the invention resides in the reduced noise associated with brake release.

Another benefit of the invention resides in the ease with which the existing structure may be modified to accommodate the noise reduction feature.

Still another benefit of the invention resides in the preservation of the quick-release function during brake release.

Still other features and benefits of the invention will become apparent to those skilled in the art upon a reading and understanding of the following detailed description.

BRIEF DESCRIPTION OF THE DRAWINGS

FIG. 1 is a cross-sectional view through a preferred modulator valve in a schematic illustration of the brake circuit.

FIG. 2 is a perspective view of a preferred form of noise reducer.

FIG. 3 is a view similar to FIG. 1, incorporating the noise reducer of FIG. 2.

FIG. 4 is a graphical representation of the improved performance achieved with the assembly of FIG. 3.

DETAILED DESCRIPTION OF THE PREFERRED EMBODIMENTS

Although heavy vehicle ABS modulators are well-known in the art, reference may be made to commonly assigned, co-pending U.S. application Ser. No. 09/108,053, filed Jun. 6, 1998 for Non-Flow Through Solenoid for Heavy Vehicle ABS Modulators that shows and describes a modulator valve used in the anti-lock braking systems. FIG. 1 of the present application is a simplified, schematic representation of that system with the ABS solenoids removed for ease of illustration.

In FIG. 1, a brake valve 10 includes a foot pedal or treadle 12 that provides pressurized air from an air source (not shown) to a modulator valve 20 when the pedal is selectively depressed. A housing or body 22 includes a first or supply port 24 that communicates with the brake valve 10. A second or delivery port 26 communicates with a brake chamber 30, and a third or exhaust port 32 of the valve body communicates with ambient. The body further includes an internal cavity or valve chamber 34 that communicates with all three ports.

Flow through the valve is regulated by internal valve members. Illustrated in FIG. 1 are a supply or hold diaphragm 40 that cooperates with an associated seat 42 and an exhaust diaphragm 44 that cooperates with valve seat 46. When the foot pedal is depressed, pressurized air is provided to the supply port 24. The pressure in the chamber is sufficient to open the supply diaphragm 40 against the bias of spring 50 to allow the pressurized air to reach the delivery port 26. In this manner, the brake chambers of the air brakes are actuated. Pilot pressure is provided through passage 52 to a rear face of the exhaust diaphragm 44. The pilot pressure, in conjunction with spring 54, assures that the exhaust diaphragm maintains its closed position with the valve seat 46, thus normally precluding communication between the delivery port 26 and the exhaust port 32.

During the release of service braking, pressurized air from the brake chambers 30 enters the modulator valve 20 through the delivery port 26. The pressure is sufficient to overcome the biasing force of spring 54 and the force provided by the pilot pressure in the passage 52 exerted on the exhaust diaphragm. The resulting force imbalance lifts the exhaust diaphragm from its seat and provides a quick exhaust through exhaust port 32. This is illustrated by the arrows in FIG. 1. In addition, the pilot pressure in the passage 52 exhausts through the brake valve as shown by the arrows. Likewise, a portion of the expelled service air is exhausted through the brake valve by passing around the supply diaphragm 40 that is open relative to its seat 42 (again, illustrated by arrows in FIG. 1).

As service air is expelled through the exhaust port, the pressure will drop slightly. The forces exerted by the pilot pressure and the spring 54 on the exhaust diaphragm causes the diaphragm to re-seat. This blocks service air from expelling through the exhaust port. However, the blocked return service air pressure will drop at a slower rate than the piloting pressure. This results in an opening force on the exhaust diaphragm, causing it to again lift from the valve seat and expel service air through the exhaust port. This oscillating motion of the exhaust diaphragm occurs at a very high frequency. The result of the high frequency oscillation is an audible sound or honking emanating from the modulator valve during brake release. It has been observed that this results from the lack of any muffling of the noise or damping of the oscillating motion of the diaphragm to reduce the frequency of the high pitch sound.

FIG. 2 illustrates one form of a noise reducer that in the preferred arrangement is an open-celled foam 60 having an annular or disk shape. A central opening 62 is important for reasons to be described further below. The position or location of the noise reducer in the modulator valve assembly is best illustrated in FIG. 3. Spring 54 found in the embodiment of FIG. 1 has been removed from the rear face of the exhaust diaphragm. The annular configuration of the noise reducer or open-celled foam abuts against the rear face of the diaphragm along an outer annular portion. As will be appreciated the foam is normally compressed and thus the restorative forces of the foam provide a biasing force that urges the exhaust diaphragm toward a closed position with its valve seat 46. The second function of the foam is the significant reduction of the oscillation, or more precisely the frequency of oscillation, of the diaphragm as described above. As a result, although the diaphragm still moves through its full amplitude, the frequency of the oscillations are reduced and the audible honking is likewise reduced or substantially eliminated. Consequently, the foam provides both a damping function and a spring function.

The opening 62 in the noise reducer allows the diaphragm to be lifted fully from the valve seat and engage a stop surface 70, as shown in FIG. 3. This engagement of the diaphragm with the stop surface defines the maximum displacement of the exhaust diaphragm and maximizes the amount of air that is expelled through the exhaust port during the release of service braking. The opening 62 in the noise reducer accommodates this maximum displacement of the diaphragm and thus does not appreciably interfere with the amplitude or displacement of the diaphragm toward engagement with the stop surface. On the other hand, the compressible nature of the open-celled foam allows the noise reducer to provide both a dampening and a spring bias on the diaphragm. This assures that the diaphragm remains seated during the application of the service brakes, i.e., serving the function of spring 54, as well as providing the damping function necessary to reduce the oscillation frequency of the exhaust diaphragm during brake release.

Using an open-celled polyether foam is also advantageous since it does not interfere with, nor is it hampered by, other features of the modulator valve. For example, the polyether foam is substantially impervious to moisture, oil, dirt, and alcohol--potential contaminants that may be encountered in an air brake system. None of these have a deleterious effect on the operation of the foam in the damping and spring bias modes. In addition, the open-celled arrangement still allows air to pass through the foam so that it does not hinder operation of the exhaust diaphragm.

Moreover, the annular conformation of the foam is easily incorporated into the existing valve structure, and aside from the removal of the spring 54, results in a substantial improvement in its operation, i.e., limiting the audible sound associated with the quick release function, while still maintaining all the desirable benefits of the quick release and modulator valve structure.

As graphically illustrated in FIG. 4, the frequency or oscillations are effectively reduced. The overall intensity or amplitude of the diaphragm movement remains substantially the same. Thus, the dotted line representation 72, on the right-hand side of the graph, is representative of known modulators, while the solid line representation 74 illustrates the reduced frequency achieved with the noise reducer of the present invention.

Alternative solutions were considered for a noise reducer. For example, a screen or sintered material was considered. One sintered material was placed in the exhaust port to act as a muffler. Although it did achieve some reduction in the audible sound, it also reduced or slowed down performance of the exhaust function. It is also contemplated that alternative materials than the polyether foam may be considered. Preferably, an alternative material would also be unaffected by contaminants such as dirt, moisture, oil, and alcohol. Accordingly, alternative structures are envisioned that also would operate either as a noise reducer to muffle the generated sound or indirectly impact on the generation of the noise. These alternatives may prove useful in some circumstances, although the open-celled foam arrangement is still deemed to be most preferred.

The invention has been described with reference to the preferred embodiments. Obviously, modifications and alterations will occur to others upon a reading and understanding of this specification. The invention is intended to include such modifications and alterations insofar as they fall within the scope of the appended claims or the equivalents thereof.

Having thus described the invention, it is now claimed:

1. An ABS modulator valve assembly for a pneumatic brake system comprising:

a valve body having a supply port in communication with an associated brake chamber;

an exhaust port in communication with atmosphere;

a diaphragm interposed between the delivery port and the exhaust port for normally precluding communication therebetween; and a dampening material operatively engaging a face of the diaphragm and urging the diaphragm toward its normally closed position, the dampening material reducing the oscillation frequency of the diaphragm.

2. The valve assembly of claim 1 wherein the diaphragm is secured along its perimeter and a central portion moves between full open and full closed positions, the dampening material being located along the perimeter so that movement of the diaphragm to a full open position is uninhibited.

3. The valve assembly of claim 1 wherein the dampening material is a polyether material.

4. The valve assembly of claim 1 wherein the dampening material is an open-celled foam.

5. The valve assembly of claim 1 wherein the dampening material has an annular conformation.

6. The valve assembly of claim 1 wherein the dampening material is substantially impervious to moisture, dirt, oil, and alcohol.

7. The valve assembly of claim 1 wherein the dampening material is normally under compression when mounted in the valve body to urge the diaphragm toward a first position.

* * * * *